(12) United States Patent
Zhai

(10) Patent No.: US 11,275,851 B2
(45) Date of Patent: Mar. 15, 2022

(54) SYSTEM, METHOD, AND STORAGE MEDIUM FOR DISTRIBUTED DATA MANAGEMENT

(71) Applicant: Beijing DiDi Infinity Technology and Development Co., Ltd., Beijing (CN)

(72) Inventor: Jinjian Zhai, Union City, CA (US)

(73) Assignee: Beijing DiDi Infinity Technology and Development Co., Ltd., Beijing (CN)

( * ) Notice: Subject to any disclaimer, the term of this patent is extended or adjusted under 35 U.S.C. 154(b) by 164 days.

(21) Appl. No.: 16/720,320

(22) Filed: Dec. 19, 2019

(65) Prior Publication Data

US 2021/0192061 A1 Jun. 24, 2021

(51) Int. Cl.
G06F 21/00 (2013.01)
G06F 21/60 (2013.01)
G06F 21/62 (2013.01)

(52) U.S. Cl.
CPC .......... *G06F 21/604* (2013.01); *G06F 21/602* (2013.01); *G06F 21/6227* (2013.01); *G06F 21/6272* (2013.01)

(58) Field of Classification Search
None
See application file for complete search history.

(56) References Cited

U.S. PATENT DOCUMENTS

2003/0208533 A1* 11/2003 Farquharson ....... H04L 41/5003 709/203
2017/0286717 A1 10/2017 Khi et al.
2019/0213356 A1 7/2019 Vagujhelyi et al.
2019/0342096 A1* 11/2019 Starosielsky ......... H04L 63/083
2019/0349426 A1* 11/2019 Smith ................... H04L 67/104

FOREIGN PATENT DOCUMENTS

| CN | 105741536 A | | 7/2016 |
| CN | 108566383 A | * | 9/2018 |
| CN | 108566383 A | | 9/2018 |
| CN | 108768972 A | | 11/2018 |
| CN | 108989285 A | | 12/2018 |

OTHER PUBLICATIONS

PCT International Search Report and the Written Opinion dated Mar. 18, 2021, issued in related International Application No. PCT/CN2020/137424 (9 pages).

* cited by examiner

*Primary Examiner* — Andrew J Steinle
(74) *Attorney, Agent, or Firm* — Sheppard Mullin Richter & Hampton LLP

(57) ABSTRACT

Methods, systems, and apparatus, including computer programs encoded on computer storage media, for decentralized data management are provided. One of the methods includes: instructing, by an operator, a client to obtain data from a data source, wherein the operator is not allowed to directly obtain data from the data source; receiving, by the operator, encrypted data from the client, wherein the encrypted data is generated by the client based on the obtained data from the data source and an encryption key of an authorized data consumer; and storing, by the operator, the encrypted data into a data store for the authorized data consumer to access and decrypt, wherein the operator is not allowed to read the saved encrypted data from the data store.

17 Claims, 7 Drawing Sheets

SYSTEM, METHOD, AND STORAGE MEDIUM FOR DISTRIBUTED DATA MANAGEMENT

TECHNICAL FIELD

The disclosure generally relates to systems and methods for distributed data management and, in particular, to systems and methods for distributed data management.

BACKGROUND

The management of data is both critical and challenging as it often comes hand in hand with privacy and security concerns. These concerns call for technical safeguards of the utmost standards and strict compliances with the principles and regulations regarding data management. For instance, the data management may include multiple phases such as collection, storage, and consumption (e.g., analysis, mining). The existing solutions for data management may combine more than one of the data handling phases into one task and use a single party to perform the task for efficiency purpose. However, such solutions may grant the single party unnecessary authorities to access the data and may lead to data security vulnerabilities. In order to provide a higher level of data privacy and safety protection, a method that decouples the various data handling phases is desired.

SUMMARY

Various embodiments of the present disclosure may include systems; methods; and non-transitory computer readable media for distributed data management.

According to one aspect, a computer-implemented method for distributed data management may comprise: instructing, by an operator; a client to obtain data from a data source, wherein the operator is not allowed to directly obtain data from the data source; receiving, by the operator, encrypted data from the client, wherein the encrypted data is generated by the client based on the obtained data from the data source and an encryption key of an authorized data consumer; and storing, by the operator, the encrypted data into a data store for the authorized data consumer to access and decrypt, wherein the operator is not allowed to read the saved encrypted data from the data store.

In some embodiments, the storing the encrypted data into the data store may comprise: transforming the encrypted data into a structured data; and storing the structured data into the data store.

In some embodiments, the method may further comprise removing the encrypted data from the operator's storage medium.

In some embodiments, the instructing the client to obtain the data from the data source may comprise: transmitting a user account identifier and one or more parameters to the client for the client to obtain the data from the data source according to the user account identifier and the one or more parameters.

In some embodiments, the user account identifier may be mapped to a user account information comprising one or more of the following: token, cookie, user id (uid), phone number.

In some embodiments, the one or more parameters may comprise one or more of the following: location information and time period information.

In some embodiments, the operator may be configured to instruct the client to perform: starting data collection according to the user account identifier and the one or more parameters; stopping the data collection; or restarting the data collection.

In some embodiments, the encrypted data may comprise ride-hailing user payment information, ride-hailing trip information, ride-hailing user location information; and the storing, by the operator, the encrypted data into a data store may comprise: storing the ride-hailing user payment information into a first data store; storing the ride-hailing trip information into a second data store; and storing the ride-hailing user location information into a third data store.

In some embodiments, the storing the encrypted data into the data store may comprise: storing the encrypted data into the data store by using a Data Access Object (DAO) associated with the data store.

In some embodiments, the encrypted data may be tagged with a time to live (TTL), and the encrypted data may be automatically removed from the data store upon expiration of the TTL.

Various aspects of the present disclosure provide a system for distributed data management. The system may comprise instructing, by an operator, a client to obtain data from a data source, wherein the operator is not allowed to directly obtain data from the data source; receiving, by the operator, encrypted data from the client, wherein the encrypted data is generated by the client based on the obtained data from the data source and an encryption key of an authorized data consumer; and storing, by the operator, the encrypted data into a data store for the authorized data consumer to access and decrypt, wherein the operator is not allowed to read the saved encrypted data from the data store.

According to yet another aspect, a non-transitory computer-readable storage medium for distributed data management. The storage medium may be configured with instructions executable by one or more processors to cause the one or more processors to perform operations comprising: instructing, by an operator, a client to obtain data from a data source, wherein the operator is not allowed to directly obtain data from the data source; receiving, by the operator, encrypted data from the client, wherein the encrypted data is generated by the client based on the obtained data from the data source and an encryption key of an authorized data consumer; and storing, by the operator, the encrypted data into a data store for the authorized data consumer to access and decrypt, wherein the operator is not allowed to read the saved encrypted data from the data store.

Embodiments disclosed herein have one or more technical effects. In some embodiments, the disclosed methods and systems isolate data collection, data storage, and data consumption, which improves data security and privacy protection. In one embodiment, the party (e.g., a client) collecting the data may not know the final storage destination of the data, the party (e.g., a data store) storing the data may not be aware how the data is collected, and the party (e.g., authorized user) consuming the data may not recognize where the data came from. In some embodiments, the initiator of a data collection task, such as an operator in this specification, may configure the task by providing customized parameters including proper authorization to access the data. The operator may request a client to execute the task without understanding how the data would be collected. Furthermore, the data may be encrypted by the client who executes the task before sending it to the operator. As a result, the operator may forward the data without accessing to the underlying content. In some embodiments, the operator may save data into the data store but be refrained from reading data therein, and only authorized users may be allowed to read the stored data. In this way, the data producer and the data consumer may be separated and efficiently managed.

These and other features of the systems, methods, and non-transitory computer readable media disclosed herein, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for purposes of illustration and description only and are not intended as a definition of the limits of the invention.

BRIEF DESCRIPTION OF THE DRAWINGS

Preferred and non-limiting embodiments of the invention may be more readily understood by referring to the accompanying drawings in which.

DETAILED DESCRIPTION

Figure 1:
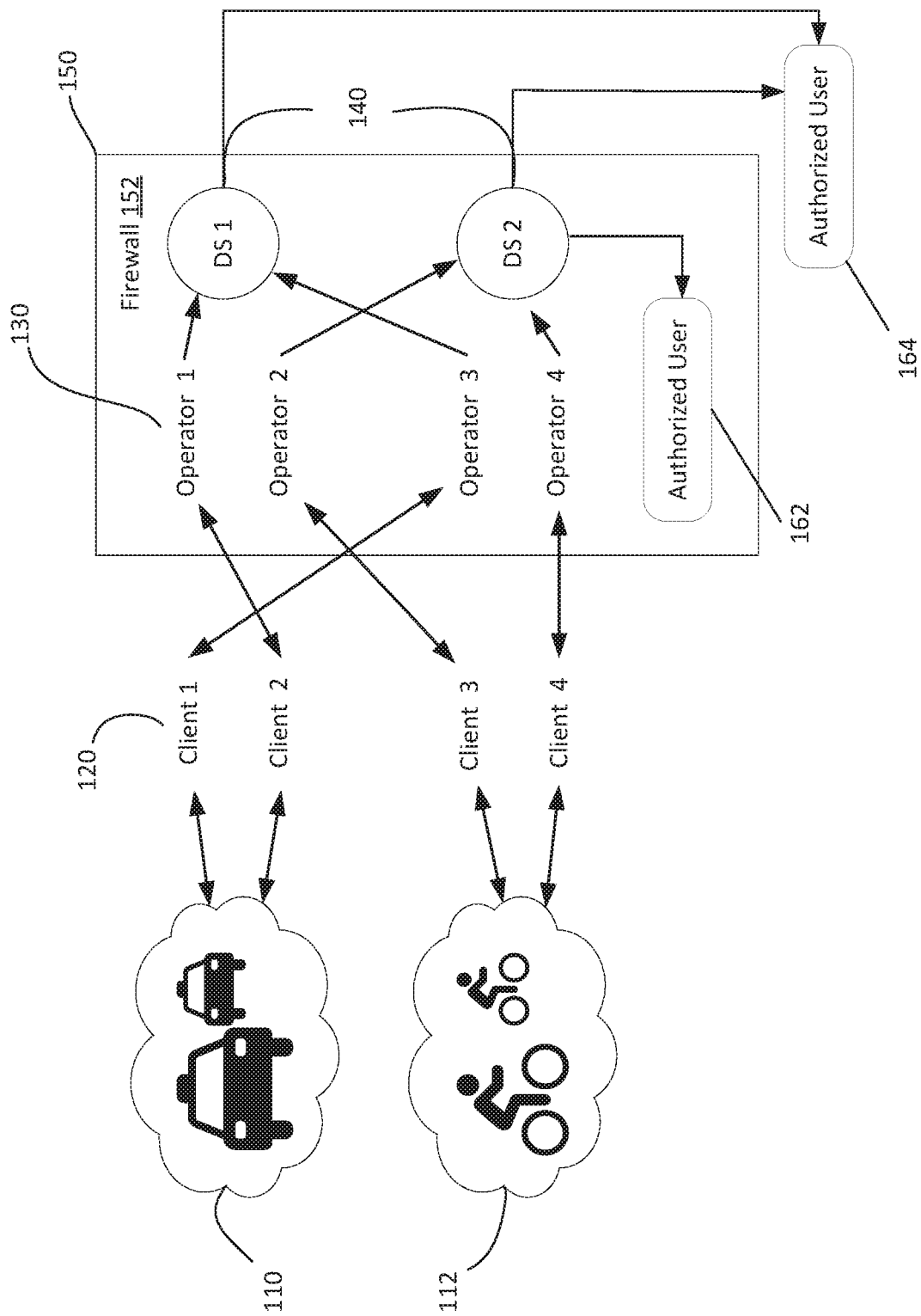
FIG. 1 illustrates an example network environment for distributed data management in accordance with some embodiments.

Specific, non-limiting embodiments of the present invention will now be described with reference to the drawings. Particular features and aspects of any embodiment disclosed herein may be used and/or combined with particular features and aspects of any other embodiment disclosed herein. It should also be understood that such embodiments are by way of example and are merely illustrative of a small number of embodiments within the scope of the present invention. Various changes and modifications obvious to one skilled in the art to which the present invention pertains are deemed to be within the spirit, scope and contemplation of the present invention as further defined in the appended claims.

In some embodiments, a company may need to collect user data from various data sources to learn users' behaviors and preferences in order to optimize its business strategies and offer better services. The data to be collected may be "primary data" or "secondary data." The "primary data" may refer to data obtained directly from the source. For example, a technology company may offer an ecosystem with various services including a ride-hailing service to its users. When a user uses the ride-hailing service, certain data may be collected with consent, such as age, gender, places of interests, daily routes (e.g., from the user's smart phone). The company may want to extract certain useful information from the data and use such information in other services offered by the ecosystem in order to provide a better overall user experience. In this case, the data collected may be "primary data" as it may be obtained directly from customers with permission. The "secondary data" may refer to data gathered after another party initially recorded it. For example, a ridesharing platform may facilitate transportation service by connecting drivers of vehicles with passengers. The platform may accept requests for transportation from passengers, identify idle vehicles to fulfill the requests, arrange for pick-ups, and process transactions. The ride-hailing platform may partner with a remote service provider in a different region (e.g., city, state, or country) to offer its ride-hailing services therein. The user data in that region may be first collected by the remote service provider with user's consent, and then gathered by the ride-hailing company with appropriate authorization. In this case, the data gathered may be "secondary data" as it is obtained after the remote service provider initially collected it.

In some embodiments, data sources may provide various channels from which the data may be obtained. For example, for "primary data" to be collected from a user's smart phone, the operating system on the smart phone may provide certain APIs to retrieve location information. As another example, for "secondary data," the data source (i.e., the initial data collector) may offer protocols, APIs, or libraries for another party to access the collected data. In some embodiments, the data source may prefer to hide these channels from the data requestors (e.g., for security concerns or to comply with regulations). For instance, the data source may create multiple authorized clients to use internal protocols, APIs, or libraries to access the data, while the data requestors may only make requests to the authorized clients without knowing how the data is actually stored or accessed.

In some embodiments, a data source may provide multiple clients, with each client obtaining a specific subset of the data. For example, a ride-hailing service provider may offer a client that obtains order-related information, and another client that retrieves user profile data. In some embodiments, the clients may directly pass the obtained data from the data source over to the data requestors without storing it. In one embodiment, the clients may encrypt the data before passing it to the requestors.

In some embodiments, a company may use various types of data stores for data storage and management. For example, a "general purpose data store" may be used to store non-user-related information, such as cities in which the company's services are deployed, places of interest, zip codes, latitudes and longitudes. As another example, multiple "sensitive data stores" may be used to store user-related information, with each "sensitive data store" focusing on a specific type of user data. For example, a company providing ride-hailing services may have one "sensitive data store" to keep users' historical location information, and another "sensitive data store" to keep order-related information. Separately storing the users' data in multiple specialized data stores may offer efficient data management (as data in each store has a uniform structure) as well as enhanced data security (e.g., a data theft may have to breach multiple data stores to aggregate the data in order to make use of it).

FIG. 1 illustrates an example network environment for distributed data management in accordance with some embodiments. As shown, the environment in FIG. 1 may include data sources such as a ride-hailing platform 110 and a bike-sharing platform 112, one or more clients 120, one or more operators 130, one or more data stores 140, other suitable components, or any combination thereof.

With permission, the data sources (e.g., the ride-hailing service provider 110 and the bike-sharing service provider 112) may collect users' data through their platforms such as web portals, applications. For example, for a ride-hailing platform, user data like order information, trip information, payment information, location information may be collected. In some embodiments, the data sources 110 and 112 may provide data access protocols, APIs, or libraries for authorized clients to access the collected user data.

In some embodiments, for security purposes, the data sources 110 and 112 may be associated with multiple authorized clients that internally use the protocols, APIs, or libraries to access the data. For example, the ride-hailing data source 110 may have client 1 and client 2, where client 1 may use certain APIs to obtain user-location information, and client 2 may call certain libraries to obtain order-related information. In one embodiment, the client (either client 1 or client 2) may be a program or a function that takes in parameters (such as user account information X, location information Y, and time window Z) and uses corresponding protocols, APIs, or libraries to obtain the data based on the parameters (such as "user X's trips in city Y in last Z weeks"). In some embodiments, a client 120 may not initiate the data-accessing action by itself. In some embodiments, a client 120 may be a "passive listener" waiting for instructions such as triggering signals to start or resume the data-accessing action, or stop the on-going action.

In some embodiments, a data collection system 150 may obtain data from the data sources 110 and 112. As shown in FIG. 1, the data collection system 150 may use operators 130 to initiate data collection tasks and use data stores 140 to save the collected data. In some embodiments, the data collection system 150 and the data sources 110 and 112 may not necessarily reside in the same network. For example, the data source 110 may correspond to the ride-hailing service serving a remote location (may be in a different network as the headquarter), the data source 112 may correspond to the bike-sharing service serving a local area (may be in the same network as the headquarter), and an anti-fraud team in the headquarter may request to audit the data collected by these two data sources to detect fraudulent activities and protect users.

In some embodiments, an operator 130 may be a program (or a binary compiled from the program) that configures the data collection tasks for the client 120 to execute. For example, the task may comprise information of a user account, one or more parameters, and an identifier associated with the client. In some embodiments, each operator 130 may use multiple clients 120 to execute a task. In some embodiments, the information of the user account may be a user account id, which may be associated with a set of information corresponding to the user (e.g., token, cookie, uid, phone number). In some embodiments, the one or more parameters may include location information (e.g., city, zip code, a pair of latitude and longitude), time period (e.g., last X days or weeks, the month of January), another suitable information, or any combination thereof. The location information may be obtained from a general-purpose data store that stores non-sensitive (e.g., non-user-related data). For example, a ride-hailing service provider may maintain a general-purpose data store maintaining public information such as cities in which its service has been deployed, places of interest within each city or region, zip codes. In some embodiments, the identifier associated with a client may be a network address of the client, such as the IP address, MAC address, another suitable network identity, or any combination thereof.

In some embodiments, the operators 130 and the clients 110 may exchange data freely. For example, when operator 1 being executed, it may send data (e.g., parameters, account information) to the corresponding client 2 identified by the client identifier, and the client 2 may, subsequently transfer the data obtained from the data source 110 back to the operator 1. In some embodiments, the client 120 may encrypt the data before transferring it to the operator 130. The encryption may use symmetric encryption, asymmetric encryption, another suitable encryption method, or any combination thereof.

In some embodiments, the operators 130 may transform the data received from the clients 120 into structured data before saving it to the data stores 140. For example, the data received from a client 120 may be a string. The operator 130 may need to know the format of the string (e.g., first X bytes of each string is user_id, next Y bytes of each string is the first location coordinates) but not the content of the string. In some embodiments, the format of the data returned from the client 120 may be known to the operator 130, or learned by the operator 130 from querying the client 120.

In some embodiments, the operators 130 may be allowed to save data into the data stores 140, but barred from reading data therein. In some embodiments, only authorized users 162 and 164 may be allowed to read data from the data stores 140. This unidirectional data flow from the operators 130 to the data stores 140 may make the operators the data producers, and restrict data consumptions to the authorized users 162 and 164.

In some embodiments, an operator 130 may configure a non-stopping data collection task that continuously uses a client 120 to collect data. Such non-stopping logic may be implemented using while-loops. The computing system running such operator 130 may have background jobs (such as crop jobs, a probing thread) checking if the operator 130 has stopped, and restart the stopped operator 130 if necessary. In some embodiments, the operator 130 may configure a periodical data collection task that triggers corresponding client 120 to collect data periodically (e.g., every hour, every week). In some embodiments, the operators 130 may, configure one-time data collection tasks that only collect data once.

In some embodiments, the operators 130 may not store any of the data received from the clients 120. The temporary copies of the data in the memories of the operators 130 may be erased after the data being saved to the data stores 140. For example, some operators 130 may be implemented using Go language that supports automatic memory management, such as automatic memory allocation, garbage collection and memory deallocation. These Golang-implemented operators 130 may automatically clean up memories after each running cycle. In some embodiments, the operators 130 may proactively erase the temporary copies of the data.

In some embodiments, the data stores 140 may use Data Access Object (DAO) pattern to separate low level data accessing APIs or other details of the underlying databases from the high-level services. In order to save data to the data stores 140, in some embodiments, one operator 130 may use a DAO (or re-use an existing DAO) associated with the target data store 130 to save data. For example, the DAO may provide insert, delete, update interfaces allowing the operator 130 to inject the data into the data store 140.

In some embodiments, the operators 130 and the data stores 140 may reside within the same network protected by a firewall 152. In some embodiments, the data stores 140 and the authorized users 162 may not necessarily locate in the same network. For example, authorized user 162 may be in the same network as the data store 140, while the authorized user 164 may be out of the network. In some embodiments, an out-of-network authorized user 164 may need to use virtual private network (VPN) services to access the data stores 140.

In some embodiments, the operators 130 and clients 120 may not necessarily be in the same network. The operators 130 may use VPN services to establish the communication. For example, one operator 130 may include information of the VPN service to be used during the configuration of the data-collection task.

Figure 2:
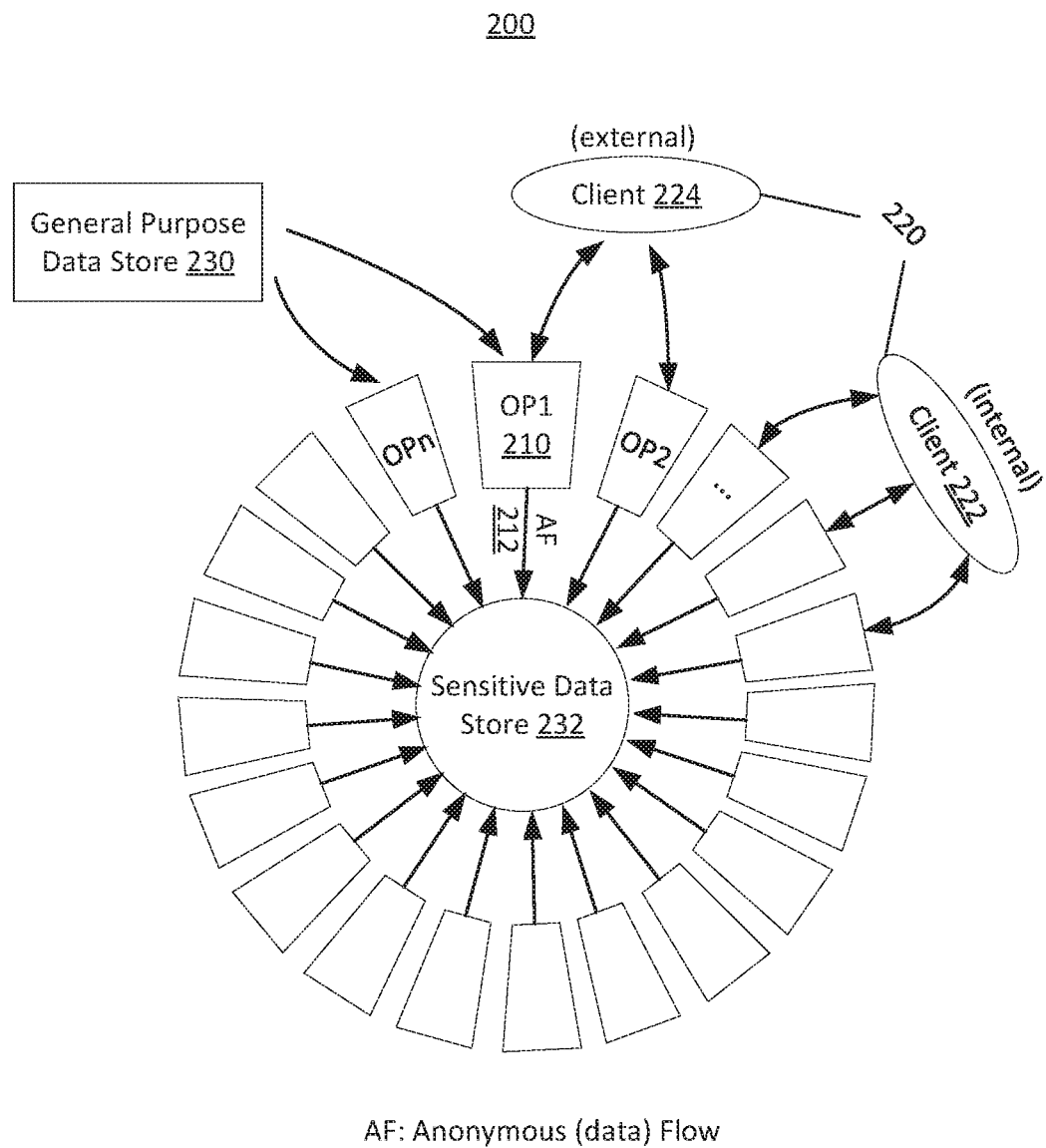
FIG. 2 illustrates an example system for data collection and data storage using distributed data management in accordance with some embodiments.

FIG. 2 illustrates an example system for data collection and data storage using distributed data management in accordance with some embodiments. As shown in FIG. 2, the system 200 may have a group of operators 210 (e.g., OP1, OP2, OPn) that populate data into the sensitive data store 232. Each operator 210 may initiate one data collection task. In some embodiments, the system 200 may create as many operators 210 as necessary. In some embodiments, an operator 210 may configure the data collection task by providing parameters. For example, the operator 210 may obtain some non-user-specific parameters from a general-purpose data store 230, such as cities, regions, zip codes. As another example, the operator 210 may directly determine the temporal parameters to limit the task to only collect the data from the specified time window.

In some embodiments, when an operator 210 is executed, it may schedule a corresponding client 220 to act. The scheduling may include starting the client 220 to collect data, stopping the client 220, starting the client 220 according to a predetermined arrangement, and so on. The client's 220 action may include working with the corresponding data source to authenticate the data collection request, obtaining certain user-specific data from a data source associated with the client 220, another suitable action, or any combination thereof. In some embodiments, the client 220 may transfer the obtained data back to the operator 210, who may subsequently transform the obtained data into structured data and save it into the sensitive data store 232. In some embodiments, the data flow between operators 210 and clients 220 are bidirectional (i.e., data may flow in both directions), while the data flow between operators 210 and sensitive data stores 232 may be unidirectional (i.e., data may only flow from the operators 210 into the sensitive data store 232 but not the other way around).

In some embodiments, each operator 210 may specify a client to perform the data collection task by including an identifier of the client 220. For example, OP1 210 may include the identifier (such as IP address, host name) associated with client 224. When OP1 210 runs, it may control client 224 in various ways including starting, stopping, or scheduling client 224 to act. In some embodiments, each operator 210 may also include parameters to define the scope of the data collection. For example, OP1 210 may provide a user account id, a city, a time window to client 224 to collect the corresponding data. The user account id may be mapped to a set of user account information such as token, cookie, uid, phone number.

In some embodiments, an operator 210 may user more than one clients 220 when necessary. The multiple clients 220 may be used to mine the same data source. For example, the operator 210 may use a first client 220 to obtain certain data from the data source, and feed the obtained data to the second client 220 to obtain the target data. In some embodiments, the clients 220 may perform identity validation, verification, and authentication on the tasks before kicking off the data collection processes.

In some embodiments, after receiving the data from a client 220, the operator 210 may transform the received data into structured data before saving it to the sensitive data store 232. The structured data may facilitate the subsequent data processes. In some embodiments, the data flow from the operator to the sensitive data store 232 may be anonymous for privacy protection. For example, the received data may be anonymized by encryption, deprivation of personally identifiable information, another suitable data-anonymization method, or any combination thereof. In some embodiments, the operator 210 may be refrained from reading data from the sensitive data store 232.

In some embodiments, an operator 210 may be a non-stopping operator that keeps a client running to collect data. On the computer system running such operator 210, certain background tasks may be in place to check the health (e.g., heartbeat) of the processes associated with the non-stopping operator. If one or more processes associated with the non-stopping operator are paused or killed, the operator may be restarted to continue the data collection.

In some embodiments, an operator 210 may be a periodically running operator that triggers a client according to a predetermined schedule. The implementation of such operator 210 may utilize the clock of the computer system that runs the operator 210. In some embodiments, an operator may be created for one-time use. For example, the operator 210 may be designed to collect certain data in response to a specific one-time request, and may be disposed afterwards.

In some embodiments, a client 220 may be an internal client (client 222) or an external client (client 224). The "internal" and "external" may refer to "in-network" and "out-of-network," respectively. In some embodiments, an operator 210 may use VPN to communicate with external clients 222. For example, an external client 222 may be associated with an external data source, and both the client 222 and the data source are not in the same network as the operators 210 and the sensitive data stores 232. As an example, in a business setting, a technology company may serve certain services in different geographic regions, where the company may partner with local service providers to deploy its services. As a result, the data may be collected by the local service providers first, and the data sources (e.g., databases storing the collected data) may not be within the same corporate network as the headquarter of the company. If the headquarter of the company needs to audit the collected data, it may use external clients associated with the external data sources to obtain the data.

In some embodiments, multiple clients 220 may be associated with the same data source, with each client focusing on one or more specific subsets of the data stored therein. For example, a data source may have users' data collected with consent, including historical order information, payment information, locations. The data source may provide various channels to access the data, such as APIs, libraries, protocols. One client may use payment specific APIs to obtain payment information, while another client may use location specific libraries to access location information.

In some embodiments, a client 220 may anonymize the data retrieved from the data source before transferring it to the corresponding operator 210. The data anonymization may include encryption, depriving personally identifiable information, another suitable data anonymization method, or any combination thereof. For example, the data may be encrypted by the client using a key, and may be decrypted by an authorized data consumer using the same key (i.e., symmetric data encryption). As another example, the data may be encrypted by the client using an encrypted key, which may be encrypted using a public key associated with an authorized data consumer. Then the authorized data consumer may decrypt the key using its private key, and then decrypt the data using the decrypted key (i.e., a combination of symmetric and asymmetric encryption).

In some embodiments, an operator 210 may exchange data with a client 220 without knowing how the underlying actions are performed by the client 220. In some embodiments, the client 220 collecting the data for the operator 210 may not be aware of the sensitive data store 232 to which the data is eventually to be stored. In some embodiments, this architecture may separate the data collection and data storage in order to provide enhanced data security (EDS). For example, an operator 210 may communicate with one or more clients 220 through the client-provided interfaces without knowing the underlying authentication processes, APIs, libraries, or protocols used between the clients 220 and the corresponding data sources. As another example, a client 220 may communicate with one or more operators 210 by receiving tasks, executing the tasks, and returning data, without knowing the identity or the location of the sensitive data store to which the data to be saved.

Figure 3:
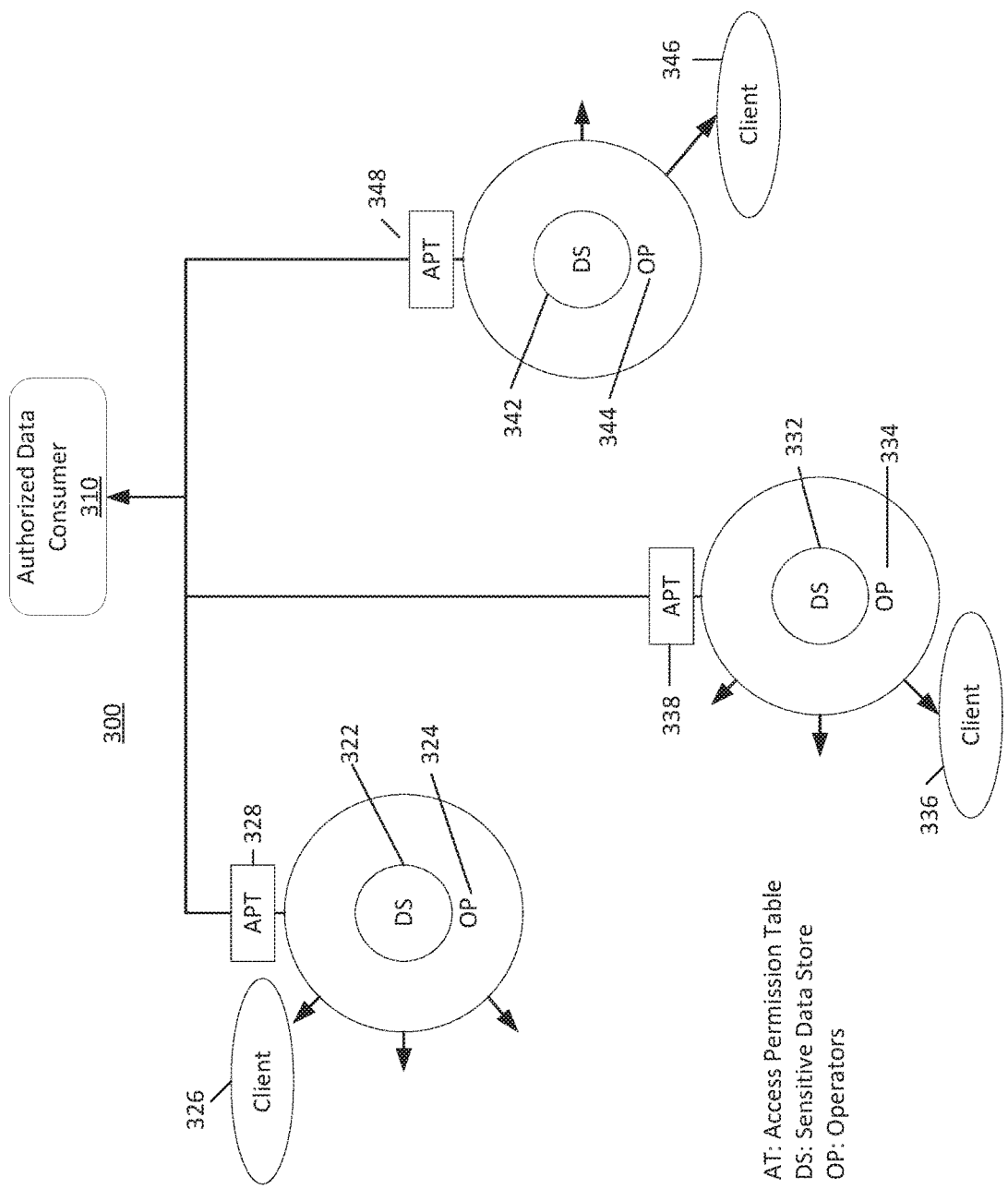
FIG. 3 illustrates an example system for data access using distributed data management in accordance with some embodiments.

FIG. 3 illustrates an example system for data access using distributed data management in accordance with some embodiments. As shown in FIG. 3, the system 300 may include multiple sensitive data stores 322, 332, and 342. Each of the sensitive data stores may be associated with multiple operators 324, 334, and 344 that populate data received from the clients 326, 336, and 346. In some embodiments, the data flow between operators and sensitive data stores may be unidirectional, where the operators may be allowed to pour data into the stores, but barred from reading data from the stores. In some embodiments, the data stored in the sensitive data stores 322, 332, and 342 may be read by authorized data consumers 310.

In some embodiments, an authorized data consumer 310 may be authorized to read data from more than one sensitive data stores 322, 332, and 342. For example, a ride-hailing service provider may have a first sensitive data store 322 storing user payment information, a second sensitive data store 332 storing trip information, and a third sensitive data store 342 storing user location information. In some embodiments, the ride-hailing user payment information may comprise payment related user data, such as recent payments for trips and/or tips, a portion of credit card information, discount information, other suitable data, or any combination thereof. In some embodiments, the ride-hailing trip information may comprise trips related user data, such as origins, destinations, durations, routes, points of interest, other suitable data, or any combination thereof. In some embodiments, the ride-hailing user location information may comprise the user's most recent location, home location, work location, or another suitable location information. In some embodiments, some of these data may be merged, or further split. In some embodiments, the anti-fraud team of the company, as an authorized consumer, may be authorized to access and aggregate the data from the above three sensitive data stores to identify fraudulent activities to protect both riders and drivers.

In some embodiments, each of the sensitive data stores may maintain an Access Permission Table (APT) to indicate if a data requestor is an authorized data consumer 310. For example, an APT may include a group of tokens, and for each token, a mapping between the token and one or more data stores. The data requestor possessing an authorized token may have access permission to read data from the one or more corresponding data stores. In some embodiments, the APT may have more detailed permission management at table (within a data store) level. In some embodiments, the APT tables may be updated when new data consumers are authorized by the system admins. In some embodiments, the APT tables may be synchronized periodically. In some embodiments, there may be a single copy of the APT stored in a centralized server, and the sensitive data stores may not need to keep separate copies of the APT.

Figure 4:
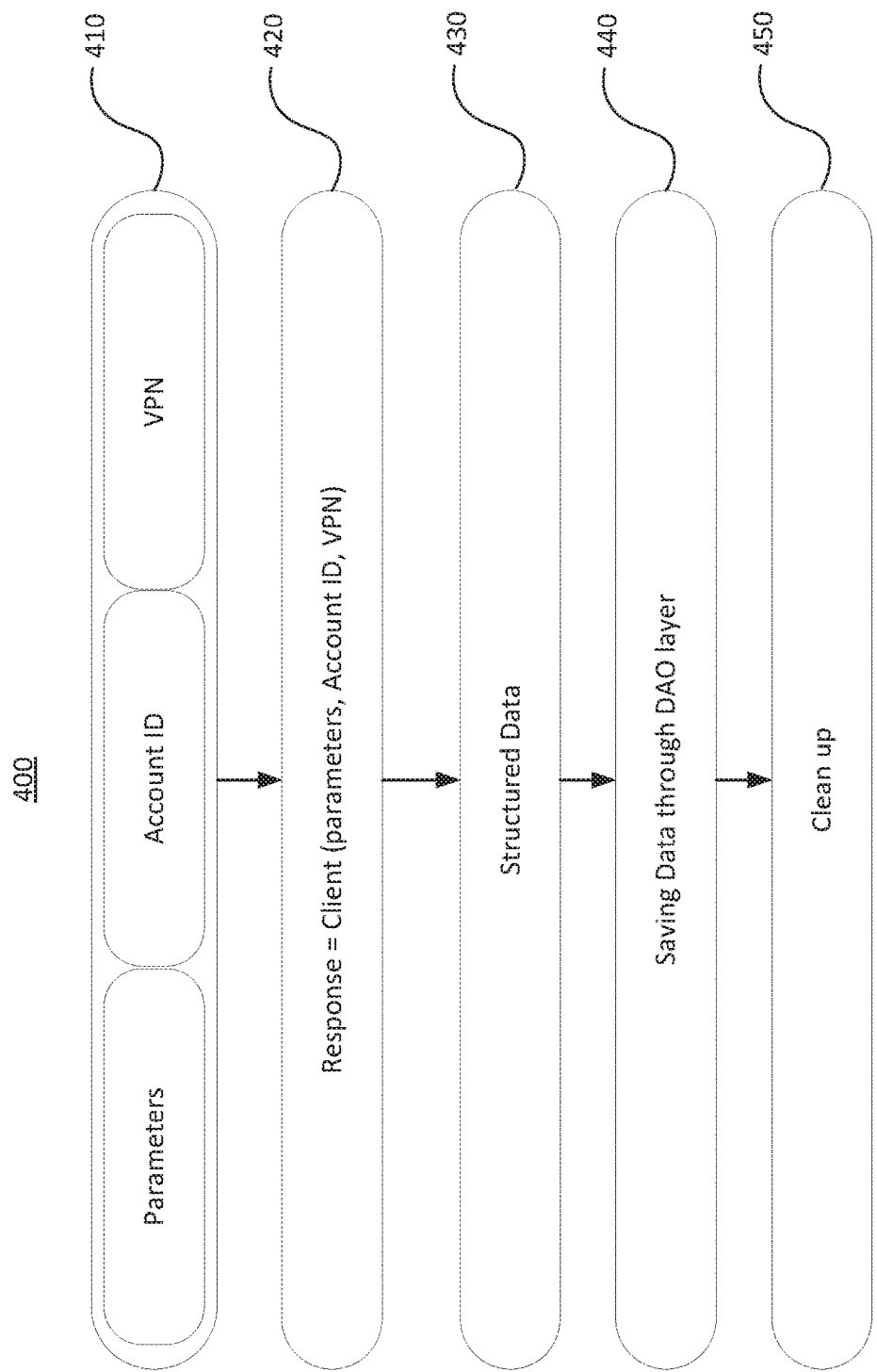
FIG. 4 illustrates an example structure of an operator in accordance with some embodiments.

FIG. 4 illustrates an example operator in accordance with some embodiments. An operator may be used to initiate a data collection task that retrieves data through a client from a data source, and save the retrieved data into a data store. As shown, the example operator 400 in FIG. 4 may include information 410 that defines the particular data collection task to be scheduled. For example, the information 410 may include a group of parameters, an account II), and optional information such as a VIN service.

In some embodiments, the group of parameters may include location information (e.g., city, zip code, a pair of latitude and longitude), time period (e.g., last X days or weeks, the month of January), another suitable information, or any combination thereof. The location information may be obtained from a general-purpose data store that stores non-user-specific data. For example, a ride-hailing service provider may maintain a general-purpose data store to keep public information (in contrast to user-related data) such as cities in which its service has been deployed, places of interest within each city or region, zip codes.

In some embodiments, the account ID may be associated with a user's account information, such as token, cookie, uid, phone number. The information may be passed to the client to prove the authentication of the data request when accessing the user's data in the data store. In some embodiments, information of a VPN service may be provided. For example, the operator 400 may need to use VPN to establish communication with external clients.

In some embodiments, the operator 400 may be associated with one client. In some embodiments, the operator 400 may contain the identifier of the client such as the client's IP address. In some embodiments, the operator may be associated with more than one client when necessary.

In some embodiments, when the operator 400 runs, it may schedule the client to perform actions. For example, the operator 400 may start the client to collect data from a corresponding data source 420. As another example, the operator 400 may pause the client for a period of time and restart the data collection. In some embodiments, the operator 400 may pass in the various information 410 (e.g., a group of parameters, an account ID, and optional information of a VPN service) to the client. The information may be used by the client to build a proper request to collect data from the corresponding data source. For example, the information including user account information X, location information Y, and time period Z may lead the client to make a request for the data regarding "user X's trips in city Y for last Z weeks.

In some embodiments, after receiving the requested data from the client, the operator 400 may transform the data into structured data 430 to facilitate the subsequent operations. For example, if the response received from the client is a string containing user data, the operator may need to parse the string and build a structured data in order to use the interfaces of the data store to save it. The operator 400 may need to know the format but not the content of the string. For example, in order to parse an encrypted string, the operator 400 may need to know that the first X bytes of the string contain user_id and next Y bytes of the string contain the first location coordinates. In some embodiments, the format of the data returned from the client may be known to the operator, or may be learned by the operator from querying the client.

In some embodiments, the operator 400 may save the structured data 430 using the Data Access Object (DAO) 440 associated with the underlying data store (e.g., a database, another type of persistent storage). The DAO may be an object or an interface that provides abstract interfaces to access the data store. For example, the DAO may be associated with a table in a database, and provide interfaces such as insert, update, delete, to manage the table. The operator may use the interfaces provided by the DAO to populate the structured data 430 into the corresponding data store.

In some embodiments, the operator 400 may need to perform clean-up 450 after the data is saved into the data store. For example, the operator 400 may erase the data locally stored (e.g., in memory, or persistent storage media). As another example, the programming language used to implement the operator 400 may have automatic memory management such as memory allocation, garbage collection, and deallocation. Such operator may automatically erase all the stored data after each running cycle.

Figure 5:
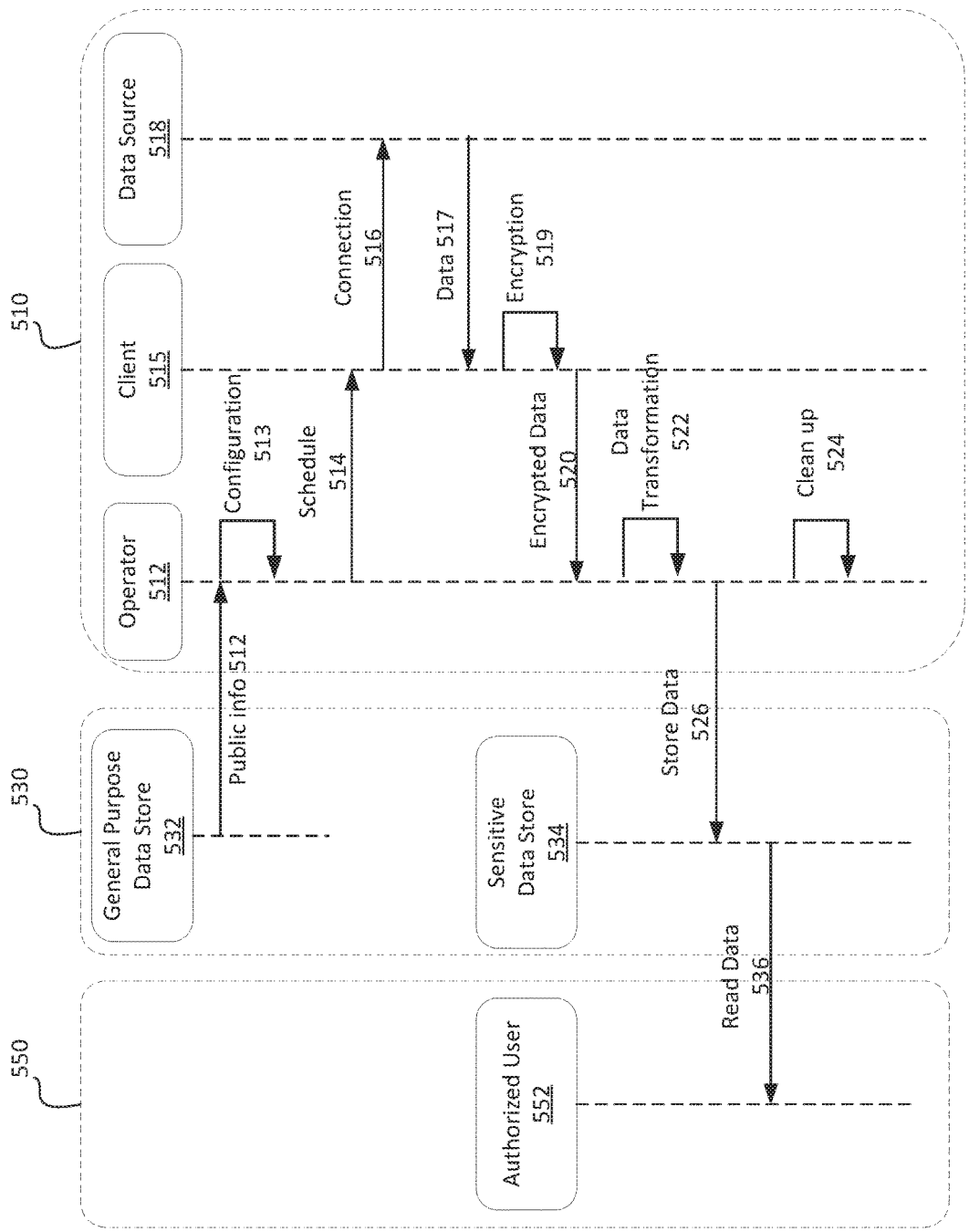
FIG. 5 illustrates an example workflow for distributed data management in accordance with some embodiments.

FIG. 5 illustrates an example workflow for distributed data management in accordance with some embodiments. As shown, the workflow may involve multiple components including data collection component 510, data storage component 530, and data consumption component 550. In some embodiments, the workflow may involve fewer, more, or different components. In some embodiments, the workflow may be deployed in the environment shown in FIG. 1. In some embodiments, the workflow may be implemented by the systems shown in FIGS. 2 and 3.

In some embodiments, the data collection component may include one or more operators 512, one or more clients 515, one or more data sources 518, other suitable components, and any combination thereof. The operators 512 may schedule tasks for the clients 515 to collect data from the data sources 518. In some embodiments, an operator 512 may be a program, application, or binary to be executed by a computing system. When executed, the operator 512 may schedule a task for the client 515 to perform.

In some embodiments, the operator 512 may optionally acquire certain public information from a general-purpose data store 532 to configure the task. For example, the operator 512 may obtain a zip code from the data store 532 and configure the task for the client 515 to obtain the data associated with the zip code. In some embodiments, the operator 512 may directly configure the task without requesting data from the general-purpose data store 532. For example, the operator 512 may specify a time window to configure the task for the client 512 in order to obtain the data collected during that specified time window. In some embodiments, the operator 512 may obtain the necessary configuration information using other suitable means.

In some embodiments, the operator 512 may include a user account identifier in order to for the client 515 to collect the data associated with that user account. In some embodiments, the account identifier may be used to determine a group of metadata (i.e., account information) of the user account such as token, cookie, uid. The metadata may be used by the client 515 or the corresponding data source 518 (or the client and the data source working collectively) to perform identity validation, verification, or authentication before authorizing the data collection. The metadata may also be used by the client to request data corresponding to the user account from the data store.

In some embodiments, the operator 512 may include an identifier associated with the client 515 to schedule the task. For example, the identifier may be the client's IP address, server or host name, another suitable network identity, or any combination thereof. In some embodiments, the operator 512 may use multiple clients 515 collectively to perform one task.

In some embodiments, the operator 512 may schedule 514 the client 515 to perform the configured task. For example, the operator 512 may start the client (so that the client starts to collect data), or stop the client. In some embodiments, the operator 512 may be a non-stopping or periodical operator. A non-stopping operator may be used to continuously trigger the client to collect the data. A periodical operator may be used to trigger the client at predetermined time intervals.

In some embodiments, the client 515, when being triggered, may establish a connection 516 with the corresponding data source 518 in order to retrieve the data based on the operator's request. In some embodiments, the client 515 may store token, password, authorization, another identity-proving data, or any combination thereof to establish the connection 516 with the corresponding data source 518. In some embodiments, one data source 518 may allow multiple clients 515 to access its data, with each client 515 collecting one or more specific subsets of the stored data. For example, the data source 518 may allow both client A and client B to read its data, with client A using one API to collect location information and client B using another API to collect users' order information.

In some embodiments, after receiving the data 517 from the data source 518, the client 515 may perform data anonymization such as encryption 519 and send the anonymized data to the operator 512. In some embodiments, the encryption may be symmetric, asymmetric, another suitable encryption method, or any combination thereof. In some embodiments, the encrypted data 520 may be decrypted by authorized user 552. In some embodiments, the encrypted data 520 may not be decrypted by the operator 512.

In some embodiments, after receiving the anonymized data such as encrypted 520 or masked data, the operator 512 may optionally transform 522 the data into structured data. For example, the encrypted data 520 received from the client 515 may be strings. The operators 512 may need to parse the strings based on the format of the strings (e.g., first X bytes of each string is user_id, next Y bytes of each string is the first location coordinates) without understanding the underlying content (i.e., encrypted content) of the strings. In some embodiments, the format of the data may be known to the operator (e.g.; based on prior knowledge), or may be learned by the operator from querying the client.

In some embodiments, the operator 512 may use the Data Access Object (DAO) associated with the sensitive data store 534 to save the structured data. The DAO may be an object or an interface that provides abstract interface to access the data store. For example, the DAO may be associated with a table in a database, and provide interfaces, such as insert, update, delete, to manage the table. The operator may use the interfaces provided by the DAO to populate the structured data 430 into the corresponding data store.

In some embodiments, after the data being saved 526 in the sensitive data store 534, the local copies in the memory of the operator 512 may be cleaned up 524. The clean-up may be proactively performed by the operator 512, or an automatic process performed by the compiler of the coding language is used to implement the operator 512. For example, Go-language has automatic memory management including allocation, garbage collection, and deallocation.

In some embodiments, the sensitive data store 534 may be read by one or more authorized users 552. One authorized user 552 may have authorizations to read data from multiple sensitive data stores. In some embodiments, the sensitive data stores 534 may each maintain an authorization table. When a user requests to access data, the each data store 534 may verify the user's authentication by checking the authorization table. The authorization tables may be synchronized with each other periodically. In some embodiments, the authorization table may be maintained by a centralized server.

In some embodiments, the operator 512 may not be aware how the client 515 accesses the data from the data source 518. In some embodiments, the client 515 may return the data to the operator 512 without knowing the final destination of the data (i.e., the identity or location of the sensitive data store 534).

In some embodiments, the data flow between the operator 512 and the client 515 may be bidirectional. For example, the operator 512 may pass parameters to the client 515, and the client 515 may send encrypted data back to the operator 512. In some embodiments, the data flow between the operator 512 and the sensitive data store 534 may be unidirectional. For example, the operator 512 may be only allowed to save data to the sensitive data store 534 but not read data therein.

Figure 6:
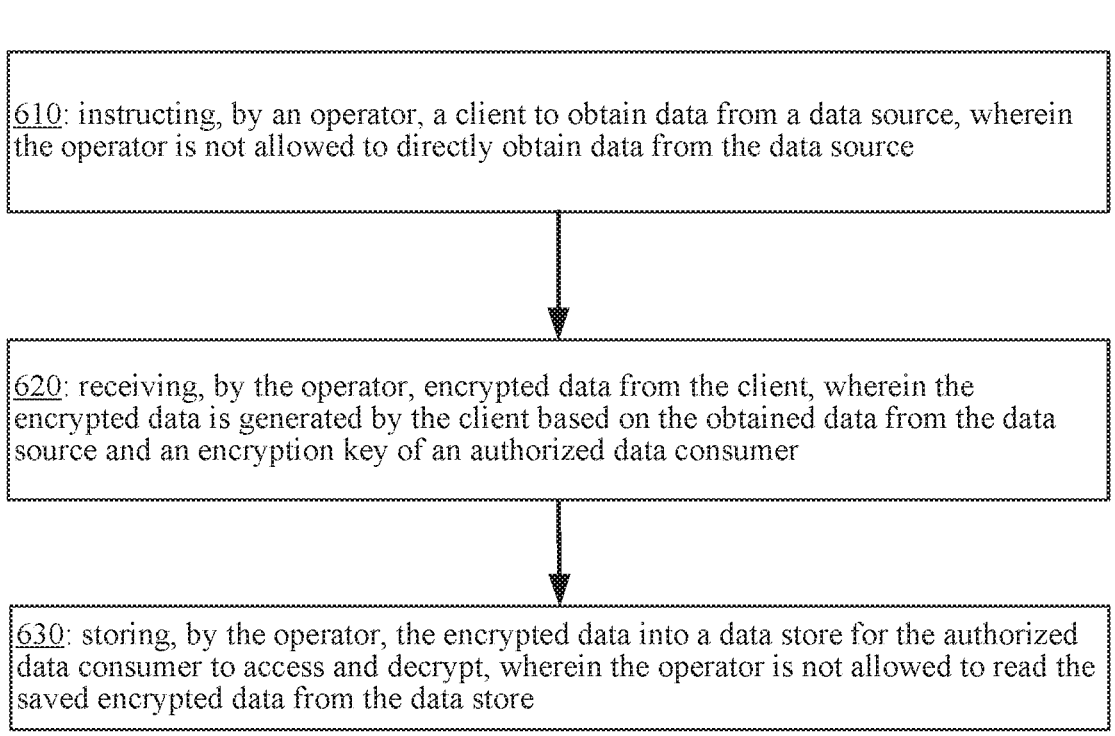
FIG. 6 illustrates a block diagram of a method for distributed data management in accordance with some embodiments.

FIG. 6 illustrates a block diagram of a method for distributed data management in accordance with some embodiments. The method 600 may be implemented in an environment shown in FIG. 1. The method 600 may be performed by a device, apparatus, or system for distributed data management illustrated by FIGS. 1-5, such as the system 200 and the system 300. Depending on the implementation, the method 600 may include additional, fewer, or alternative steps performed in various orders or in parallel.

Block 610 includes instructing, by an operator, a client to obtain data from a data source, wherein the operator is not allowed to directly obtain data from the data source. In some embodiments, the instructing the client to obtain the data from the data source may comprise: transmitting a user account identifier and one or more parameters to the client identified by an identifier for the client to obtain the data from the data source according to the user account identifier and the one or more parameters. In some embodiments, the user account identifier may be mapped to a user account information comprising one or more of the following: token, cookie, user id (uid), phone number. In some embodiments, the one or more parameters may comprise one or more of the following location information and time period information. In some embodiments, the operator may be configured to instruct the client to perform: starting data collection according to the user account identifier and the one or more parameters; stopping the data collection; or restarting the data collection. In some embodiments, the instructing the client to obtain the data from the data source may further comprise: using, by the operator, a virtual private network (VPN) to communicate with the client.

Block 620 includes receiving, by the operator, encrypted data from the client, wherein the encrypted data is generated by the client based on the obtained data from the data source and an encryption key of an authorized data consumer. In some embodiments, the encrypted data may comprise ride-hailing user payment information, ride-hailing trip information, ride-hailing user location information; and the storing, by the operator, the encrypted data into a data store may comprise: storing the ride-hailing user payment information into a first data store; storing the ride-hailing trip information into a second data store; and storing the ride-hailing user location information into a third data store.

Block 630 includes storing, by the operator, the encrypted data into a data store for the authorized data consumer to access and decrypt, wherein the operator is not allowed to read the saved encrypted data from the data store. In some embodiments, the storing the encrypted data into the data store may comprise: transforming the encrypted data into a structured data; and storing the structured data into the data store. In some embodiments, the storing the encrypted data into the data store may comprise: storing the encrypted data into the data store by using a Data Access Object (DAO) associated with the data store. In some embodiments, the encrypted data may be tagged with a time to live (TTL), and the encrypted data is automatically removed from the data store upon expiration of the TTL.

Figure 7:
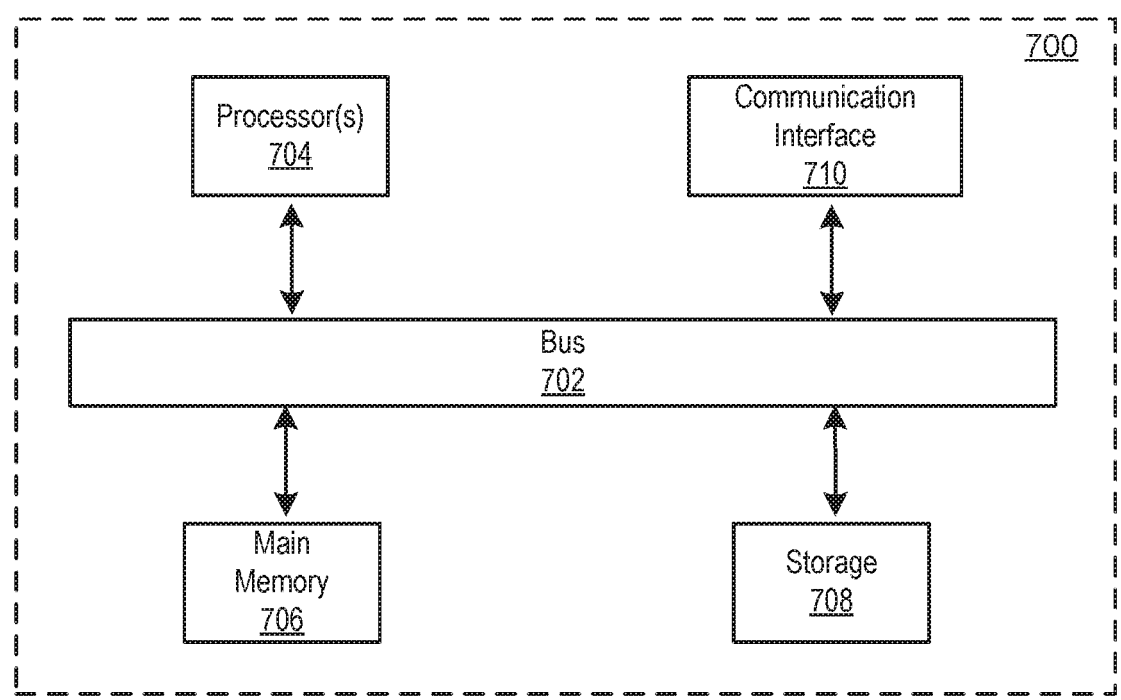
FIG. 7 illustrates a block diagram of a computer system in which any of the embodiments described herein may be implemented.

In some embodiments, the method 600 may further comprise: removing the encrypted data from the operator's storage medium, FIG. 7 illustrates a block diagram of a computer system in which any of the embodiments described herein may be implemented. The computer system 700 may comprise a bus 702 or other communication mechanism for communicating information and one or more hardware processors 704 coupled with bus 702 for processing information. Hardware processor(s) 704 may be, for example, one or more general purpose microprocessors. The methods and systems illustrated in FIGS. 1-6 may be implemented using the computer system 700.

The computer system 700 may also include a main memory 706, such as a random-access memory (RAM), cache and/or other dynamic storage devices, coupled to bus 702 for storing information and instructions to be executed by processor(s) 704. Main memory 706 also may be used for storing temporary variables or other intermediate information during execution of instructions to be executed by processor(s) 704. Such instructions, when stored in storage media accessible to processor(s) 704, may render computer system 700 into a special-purpose machine that is customized to perform the operations specified in the instructions. Main memory 706 may include non-volatile media and/or volatile media. Non-volatile media may include, for example, optical or magnetic disks. Volatile media may include dynamic memory. Common forms of media may include, for example, a floppy disk, a flexible disk, hard disk, solid state drive, magnetic tape, or any other magnetic data storage medium, a CD-ROM, any other optical data storage medium, any physical medium with patterns of holes, a RAM, a DRAM, a PROM, and EPROM, a FLASH-EPROM, NVRAM, any other memory chip or cartridge, or networked versions of the same.

According to one embodiment, the techniques herein are performed by computer system 700 in response to processor(s) 704 executing one or more sequences of one or more instructions contained in main memory 706. Such instructions may be read into main memory 706 from another storage medium, such as storage device 707. Execution of the sequences of instructions contained in main memory 706 may cause processor(s) 704 to perform the process steps described herein. For example, the processes/methods disclosed herein may be implemented by computer program instructions stored in main memory 706. When these instructions are executed by processor(s) 704, they may perform the steps as shown in corresponding figures and described above. In alternative embodiments, hard-wired circuitry may be used in place of or in combination with software instructions.

The computer system 700 also includes a communication interface 710 coupled to bus 702. Communication interface 710 may provide a two-way data communication coupling to one or more network links that are connected to one or more networks. As another example, communication interface 710 may be a local area network (LAN) card to provide a data communication connection to a compatible LAN (or WAN component to communicated with a WAN). Wireless links may also be implemented.

The performance of certain of the operations may be distributed among the processors, not only residing within a single machine, but deployed across a number of machines. In some example embodiments, the processors or processor-implemented engines may be located in a single geographic location (e.g., within a home environment, an office environment, or a server farm). In other example embodiments, the processors or processor-implemented engines may be distributed across a number of geographic locations.

Each of the processes, methods, and algorithms described in the preceding sections may be embodied in, and fully or partially automated by, code modules executed by one or more computer systems or computer processors comprising computer hardware. The processes and algorithms may be implemented partially or wholly in application-specific circuitry.

When the functions disclosed herein are implemented in the form of software functional units and sold or used as independent products, they can be stored in a processor executable non-volatile computer readable storage medium. Particular technical solutions disclosed herein (in whole or in part) or aspects that contributes to current technologies may be embodied in the form of a software product. The software product may be stored in a storage medium, comprising a number of instructions to cause a computing device (which may be a personal computer, a server, a network device, and the like) to execute all or some steps of the methods of the embodiments of the present application. The storage medium may comprise a flash drive, a portable hard drive, ROM, RAM, a magnetic disk, an optical disc, another medium operable to store program code, or any combination thereof.

Particular embodiments further provide a system comprising a processor and a non-transitory computer-readable storage medium storing instructions executable by the processor to cause the system to perform operations corresponding to steps in any method of the embodiments disclosed above. Particular embodiments further provide a non-transitory computer-readable storage medium configured with instructions executable by one or more processors to cause the one or more processors to perform operations corresponding to steps in any method of the embodiments disclosed above.

Embodiments disclosed herein may be implemented through a cloud platform, a server or a server group (hereinafter collectively the "service system") that interacts with a client. The client may be a terminal device or a client registered by a user at a platform, wherein the terminal device may be a mobile terminal, a personal computer (PC), and any device that may be installed with a platform application program.

The various features and processes described above may be used independently of one another or may be combined in various ways. All possible combinations and sub-combinations are intended to fall within the scope of this disclosure. In addition, certain method or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel, or in some other manner. Blocks or states may be added to or removed from the disclosed example embodiments. The exemplary systems and components described herein may be configured differently than described. For example, elements may be added to, removed from, or rearranged compared to the disclosed example embodiments.

The various operations of exemplary methods described herein may be performed, at least partially, by an algorithm. The algorithm may be comprised in program codes or instructions stored in a memory (e.g., a non-transitory computer-readable storage medium described above). Such algorithm may comprise a machine learning algorithm. In some embodiments, a machine learning algorithm may not explicitly program computers to perform a function but can learn from training data to make a prediction model that performs the function.

Similarly, the methods described herein may be at least partially processor-implemented, with a particular processor or processors being an example of hardware. For example, at least some of the operations of a method may be performed by one or more processors or processor-implemented engines. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces an Application Program Interface (API)).

The performance of certain of the operations may be distributed among the processors, not only residing within a single machine, but deployed across a number of machines. In some example embodiments, the processors or processor-implemented engines may be located in a single geographic location (e.g., within a home environment, an office environment, or a server farm). In other example embodiments, the processors or processor-implemented engines may be distributed across a number of geographic locations.

Any process descriptions, elements, or blocks in the flow diagrams described herein and/or depicted in the attached figures should be understood as potentially representing modules, segments, or portions of code which include one or more executable instructions for implementing specific logical functions or steps in the process. Alternate implementations are included within the scope of the embodiments described herein in which elements or functions may be deleted, executed out of order from that shown or discussed, including substantially concurrently or in reverse order, depending on the functionality involved, as would be understood by those skilled in the art.

As used herein, the term "or" may be construed in either an inclusive or exclusive sense. Moreover, plural instances may be provided for resources, operations, or structures described herein as a single instance. Additionally, boundaries between various resources, operations, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

The term "include" or "comprise" is used to indicate the existence of the subsequently declared features, but it does not exclude the addition of other features. Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Although an overview of the subject matter has been described with reference to specific example embodiments, various modifications and changes may be made to these embodiments without departing from the broader scope of embodiments of the present disclosure. Such embodiments of the subject matter may be referred to herein, individually or collectively, by the term "invention" merely for convenience and without intending to voluntarily limit the scope of this application to any single disclosure or concept if more than one is, in fact, disclosed.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

What is claimed is:

1. A computer-implemented method for decentralized data management, comprising:
   constructing, by an operator, a data collection task comprising one or more of: location information, a time period, and a user account identifier, wherein the operator comprises a software program;
   sending, by the operator, the data collection task to a client to obtain data from a data source corresponding to the data collection task, wherein the operator is not allowed to directly obtain data from the data source;
   receiving, by the operator, encrypted data from the client, wherein the encrypted data is generated by the client based on the obtained data from the data source using an encryption key of an authorized data consumer; and
   storing, by the operator, the encrypted data into a data store for the authorized data consumer to access and decrypt, wherein the operator is not allowed to read the saved encrypted data from the data store.

2. The method of claim 1, wherein the storing the encrypted data into the data store comprises:
   transforming the encrypted data into structured data; and
   storing the structured data into the data store.

3. The method of claim 1, further comprising:
   removing the encrypted data from a storage medium of the operator.

4. The method of claim 1, wherein the sending the data collection task to the client to obtain the data from the data source comprises:
   transmitting the user account identifier to the client for the client to obtain the data from the data source according to the user account identifier.

5. The method of claim 1, wherein the user account identifier is mapped to a user account information comprising one or more of the following: token, cookie, user id (uid), or phone number.

6. The method of claim 1, wherein the data collection task instructs the client to perform:
   starting data collection according to the location information, the time period, and the user account identifier;
   stopping the data collection; or
   restarting the data collection.

7. The method of claim 1, wherein:
   the encrypted data comprises ride-hailing user payment information, ride-hailing trip information, ride-hailing user location information; and
   the storing, by the operator, the encrypted data into a data store comprises:
   storing the ride-hailing user payment information into a first data store;
   storing the ride-hailing trip information into a second data store; and
   storing the ride-hailing user location information into a third data store.

8. The method of claim 1, wherein the storing the encrypted data into the data store comprises:
   storing the encrypted data into the data store by using a Data Access Object (DAO) associated with the data store.

9. The method of claim 1, wherein the encrypted data is tagged with a time to live (TTL), and the encrypted data is automatically removed from the data store upon expiration of the TTL.

10. A system of an operator for decentralized data management, comprising one or more processors and one or more non-transitory computer-readable memories coupled to the one or more processors and configured with instructions executable by the one or more processors to cause the system to perform operations comprising:
    constructing, by the operator, a data collection task comprising one or more of: location information, a time period, and a user account identifier;
    sending, by the operator, the data collection task to a client to obtain data from a data source corresponding to the data collection task, wherein the operator is not allowed to directly obtain data from the data source;
    receiving, by the operator, encrypted data from the client, wherein the encrypted data is generated by the client based on the obtained data from the data source and an encryption key of an authorized data consumer; and storing, by the operator, the encrypted data into a data store for the authorized data consumer to access and decrypt, wherein the operator is not allowed to read the saved encrypted data from the data store.

11. The system of claim 10, wherein storing the encrypted data into the data store comprises:

transforming the encrypted data into structured data; and
storing the structured data into the data store.

12. The system of claim 10, wherein the operations further comprise:

removing the encrypted data from a storage medium of the operator.

13. The system of claim 10, wherein the data collection task instructs the client to perform:

starting data collection according to the location information, the time period, and the user account identifier;
stopping the data collection; or
restarting the data collection.

14. A non-transitory computer-readable storage medium of an operator for decentralized data management configured with instructions executable by one or more processors to cause the one or more processors to perform operations comprising:

constructing, by the operator, a data collection task comprising one or more of: location information, a time period, and a user account identifier;

sending, by the operator, the data collection task to a client to obtain data from a data source corresponding to the data collection task, wherein the operator is not allowed to directly obtain data from the data source;

receiving, by the operator, encrypted data from the client, wherein the encrypted data is generated by the client based on the obtained data from the data source and an encryption key of an authorized data consumer; and storing, by the operator, the encrypted data into a data store for the authorized data consumer to access and decrypt, wherein the operator is not allowed to read the saved encrypted data from the data store.

15. The storage medium of claim 14, wherein the storing the encrypted data into the data store comprises:

transforming the encrypted data into structured data; and
storing the structured data into the data store.

16. The storage medium of claim 14, wherein the operations further comprise:

removing the encrypted data from the operator's storage medium.

17. The storage medium of claim 14, wherein the data collection task instructs the client to perform:

starting data collection according to the location information, the time period, and the user account identifier;
stopping the data collection; or
restarting the data collection.

* * * * *